Figure 1:
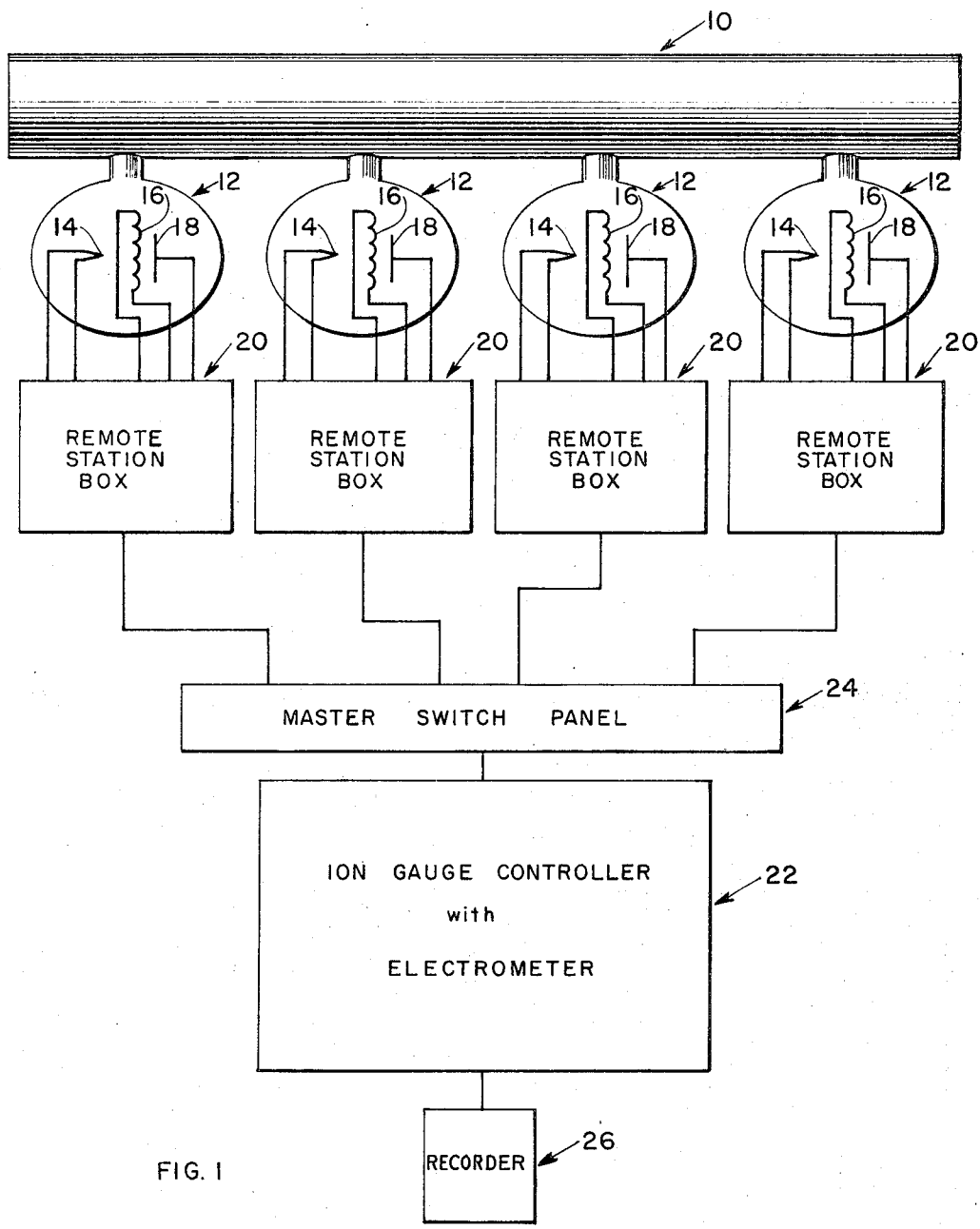

INVENTOR
ROBERT C. FINKE

BY

ATTORNEYS

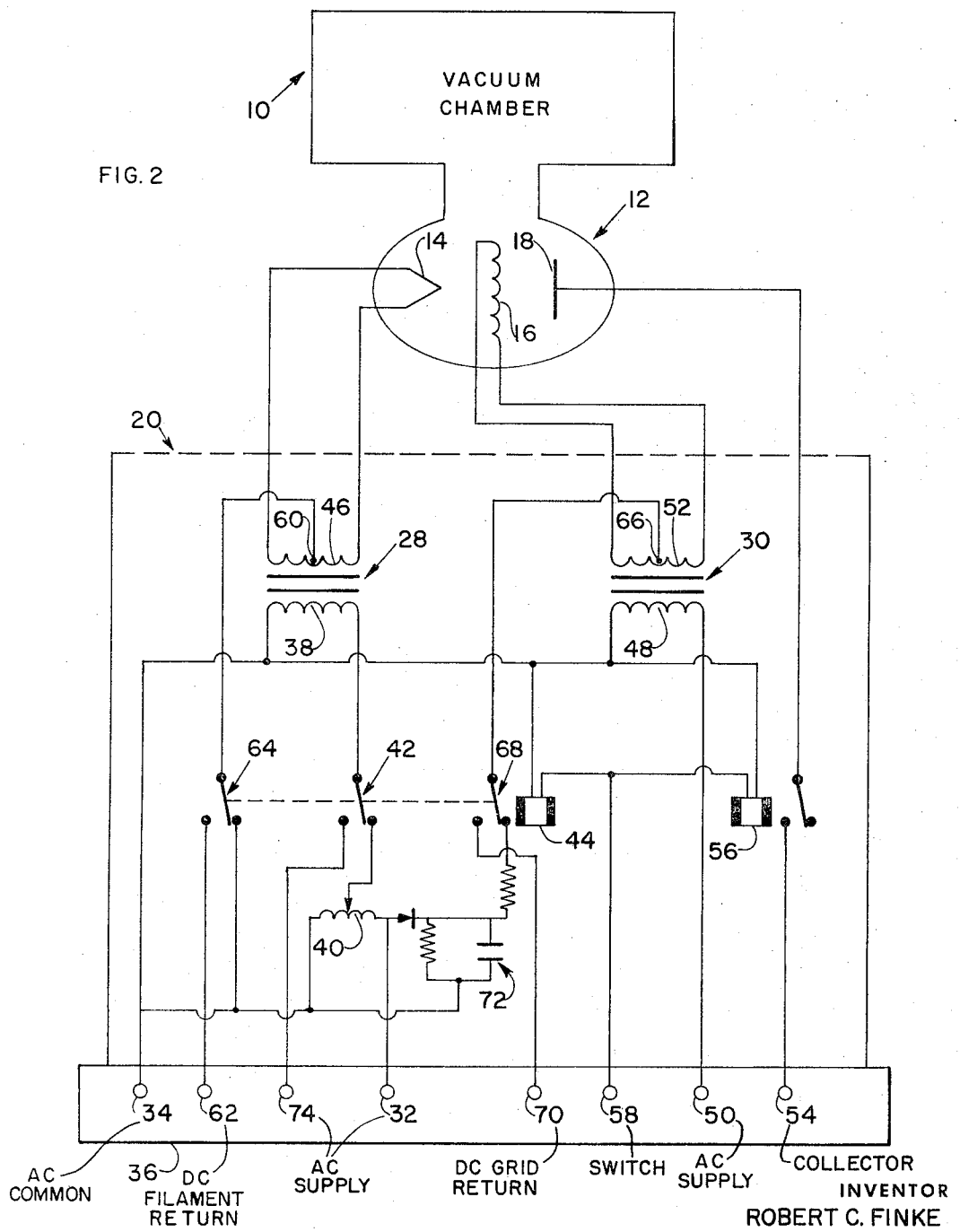

United States Patent Office 3,346,806
Patented Oct. 10, 1967

3,346,806
PRESSURE MONITORING WITH A PLURALITY OF IONIZATION GAUGES CONTROLLED AT A CENTRAL LOCATION
Robert C. Finke, Westlake, Ohio, assignor to the United States of America as represented by the Administrator of the National Aeronautics and Space Administration
Filed Dec. 12, 1963, Ser. No. 330,210
7 Claims. (Cl. 324—33)

The invention described herein may be manufactured and used by or for the Government of the United States of America for governmental purposes without the payment of any royalties thereon or therefor.

This invention is concerned with monitoring a plurality of separately located ion gauge tubes mounted on a large vacuum chamber for sensing the pressure at various locations within this chamber.

As the size of a vacuum chamber increases, the problems encountered in attempting to read widely separated gauges at a central point increases because the filament and grid currents are quite large even though the collector currents are small. These large currents require large diameter wires for transmission from the ion gauge control box to a monitoring meter.

It has been proposed that a recorder be mounted adjacent the ion gauge control box with the leads from this recorder being connected to another recorder that is centrally located and is connected to still another recorder. Such an arrangement has the disadvantage of requiring one operator to read the centrally located recorder while a second operator goes to each ion gauge tube to set the controls on the gauge control box.

It has also been suggested that a group of ion gauge tubes might be selectively operated from a specially designed ionization gauge controller in close proximity with a small group of tubes. However, the use of many of these special controllers is prohibitively expensive on very large vacuum chambers.

Another problem associated with successively reading a large number of ion gauge tubes is that of the time required for the temperature of each tube to rise to the proper value before taking a reading. This warm-up time may be on the order of one minute for most tubes.

The present invention has solved these problems by providing each ion gauge tuge with a remote station box containing one transformer for filament heating and another transformer for grid outgassing together with related controls. The primary coils of these transformers are connected to a centrally located master switch panel and ion gauge controller.

It is, therefore, an object of the present invention to provide an improved ionization gauge control system in which a number of ionization gauge tubes are controlled from a single station located at any distance from the tubes.

Another feature of the invention is the provision of a remote station box which furnishes standby heating to both the filament and the grid of an ion tube thereby enabling these elements to be readily raised to the operating temperature when it is desired to take a reading.

A further object of the invention is to provide a control system for ion gauge tubes which extends tube life, and keeps them clean by reducing condensation within the tube.

Other objects of the invention will be apparent from the specification which follows and from the drawing wherein like numerals are used to identify like parts.

FIG. 1 is a schematic drawing in the form of a block diagram of an ion gauge control system constructed in accordance with the present invention, and FIG. 2 is a wiring diagram of a remote station box utilized in the system shown in FIG. 1.

Referring now to the drawings there is shown in FIG. 1 a multiple ionization control system constructed in accordance with the invention for monitoring the pressure in a vacuum chamber 10. This system includes a plurality of ionization gauge tubes 12 mounted at various positions on the vacuum chamber 10, and the interior of each tube 12 is in communication with the interior of the chamber 10 so that the pressure within the tube 12 is the same as that within the chamber 10. By way of illustration FIG. 1 shows four tubes 12 connected to the chamber 10; however, the number of tubes used will depend upon the size of the vacuum chamber.

Each ionization tube 12 contains a filament 14 for emitting electrons, a grid 16 for receiving the electrons and a collector 18. Any gas in the tube 12 is partially ionized by this electron flow, and the resulting ions move to the collector 18. By monitoring the ion current at the collector 18 the pressure in the tube 12 is likewise monitored.

According to the present invention, a remote station box 20 is connected to each of the ion gauge tubes 12. Each remote station box 20 is, in turn, connected to an ion gauge controller 22 through a master switch panel 24.

The ion gauge controller 22 provides automatic regulation of the power supply for the filament 14 as well as a positive voltage supply for the grid 16. The controller 22 is further utilized to meter emissions from the filament and to provide range switching for signals transmitted to the readout equipment which may be in the form of a recorder 26. The controller 22 also contains a multi-range electrometer for monitoring the ion current at the collector 18.

A typical remote station box 20 containing a pair of transformers 28 and 30 is illustrated in FIG. 2. An alternating current supply in the controller 22 is connected to a terminal 32 on the box 20 through the switch panel 24 while a similar terminal 34 forms a common return. The terminal 32 is mounted on an insulated mounting plate 36 which also mounts a number of other terminals, each of which is connected to the appropriate portion of the controller 22 through the master switch panel 24.

The transformer 28 includes a primary winding 38 connected to the terminal 32 through an adjustable autotransformer 40 and a gang 42 of a three-gang relay 44. The transformer 28 further includes a secondary winding 46 connected to the filament 14.

A primary winding 48 in the transformer 30 is supplied with alternating current from an AC supply in the controller 22 through a terminal 50 upon actuation of a degas switch on the master switch panel 24. A secondary winding 52 is connected to the grid 16 and current from the transformer 30 heats the grid 16 to incandescence.

The collector 18 is in selective communication with a terminal 54 on the plate 36 through a relay 56, and the terminal 54 is connected to the electrometer in the controller 22. Actuating current is supplied to both relays 44 and 56 from a terminal 58 leading from a suitable switch on the master switch panel 24.

A center tap 60 on the secondary winding 46 of the transformer 28 is selectively connected to a terminal 62 through a gang 64 of the relay 44. The terminal 62 is connected to a regulated DC power supply in the controller 22 or a return path to the negative side of the grid DC supply. A center tap 66 on the secondary winding 50 of the transformer 30 is connected to another gang 68 of the relay 44. One contact of the gang 64 is connected to a terminal 70 which is connected to a regulated DC power supply in the controller 22 while the other contact is connected to the alternating current supply at the terminal 32 through a rectifier circuit 72.

In a normal stand-by condition the gangs of the relays 44 and 56 are in the positions shown in FIG. 2. Alternating current from the terminal 32 which is at a potential of 110 volts is rectified at 72, and a negative potential, on the order of 90 volts, is placed on the grid 16 through the center tap 66.

The filament 14 or cathode is heated by the current from the transformer 28, and the auto-transformer 40 is adjusted so that the filament is heated to a temperature slightly less than that required when a reading is taken. This normally requires a potential in the range of 2.5 to 6 volts. By heating the filament 14 and applying a DC potential to the grid 16 in this manner a small quantity of electrons are continuously emitted in the tube 12 to prevent poisoning, and tube life is extended.

When it is desired to take a reading of the ion current at the collector 18 a signal is transmitted from the master switch panel 24 to the terminal 58 which actuates the relays 44 and 56. The relay 56 places the collector 18 in communication with the terminal 54 which is connected to the electrometer in the controller 16. The relay 44 disconnects the center tap 66 from the rectifier circuit 72 and connects it to a positive DC power supply on the order of 150 volts at the terminal 70 which is impressed on the grid 16. The center tap 60 is connected to a positive DC power supply on the order of 25 volts at the terminal 62 which is impressed on the filament 14. The relay 44 further connects the primary winding 38 of the filament transformer 28 to a regulated power supply in the controller 22 through a terminal 74 which raises the temperature of the filament to the required value for the reading.

The temperature of the filament 14 is quickly raised to the required value because it has been preheated in the manner previously described. After taking a reading of the ion current on the collector 18 at the controller 22 the relays 44 and 56 are again actuated to return the gangs to the positions shown in FIG. 2, and the system is in a stand-by condition. In either positions of the relays 44 and 56 the grid 16 or anode may be heated to incandescence to drive off adsorbed gases by actuating the degas switch on the master switch panel 24.

It will be appreciated that various modifications may be made to the disclosed structure without departing from the spirit of the invention or the scope of the subjoined claims. By way of example the ion gauge tubes 12 may be sequentially read by utilizing a conventional stepping-switch circuit in the master control panel 24. Such an arrangement is highly satisfactory because the preheating of the filament 14 in the previously described manner reduces the time interval for each tube 12 to reach operating conditions. This preheating of the filament 14 further maintains the tube walls at sufficiently elevated temperatures to prevent condensation of many volatile materials.

What is claimed is:

1. Apparatus for monitoring the pressure at various locations in a vacuum chamber comprising,
a plurality of ionization gauge tubes mounted on said vacuum chamber at said locations, each of said tubes comprising
a filament for emitting electrons to ionize gases in said tube,
a grid for receiving said electrons, and
a collector for contacting ions of said gases,
means connected to each of said collectors for selectively measuring ion current in each of said tubes at spaced intervals,
means for heating each of said filaments to an elevated temperature when said ion current is measured, and
means for maintaining each of said filaments at a temperature slightly lower than said elevated temperature between said spaced intervals when said ion current is measured.

2. Apparatus as claimed in claim 1 wherein said means for heating each of said filaments comprises
a transformer having a primary winding and a secondary winding, said secondary winding being connected to said filament, and
an A.C. power supply connected to said primary winding.

3. Apparatus as claimed in claim 2 wherein each of said transformers is located immediately adjacent its respective ionization gauge tube; and
said A.C. power supply is located in a position remote from each of said tubes thereby enabling said A.C. power supply to be connected to the transformers of all of said tubes.

4. Apparatus as claimed in claim 1 including
a transformer for supplying a current to each of said grids for selectively heating the same to incandescence for driving off adsorbed gases.

5. Apparatus as claimed in claim 1 including
means for impressing a first positive D.C. potential on each of said grids when the filament in the same tube is maintained at said slightly lower temperature so that electrons are continuously emitted from said filament.

6. Apparatus as claimed in claim 5 including
means for impressing a second positive D.C. potential on each of said grids when the filament in the same tube is heated to said elevated temperature, said second positive D.C. potential being greater than said first positive D.C. potential.

7. In combination with a plurality of ionization gauge tubes of the type containing a cathode and an anode for producing a flow of electrons which ionizes gases in each tube and means for collecting ions whereby the pressure in each tube is monitored,
means for sequentially heating each of said cathodes to an elevated temperature at spaced intervals for producing an intermittent flow of electrons in each of said tubes,
means connected to each of said ion collecting means for sequentially mesuring the ion current in each tube when said cathode is heated to said elevated temperatures whereby the pressure in each tube is sequentially monitored,
means for preheating each of said cathodes to a temperature less than said elevated temperature between said spaced intervals prior to measuring said ion current for maintaining the walls of each tube in a heated condition to prevent condensation of volatile materials, and
means for impressing a positive D.C. potential on each of said anodes when its respective cathode is preheated so that a small quantity of electrons is emitted from said cathode between the intermittent flow of electrons to minimize tube poisoning thereby extending the life of each tube.

(References on following page)

References Cited

UNITED STATES PATENTS

| | | | |
|---|---|---|---|
| 2,334,356 | 11/1943 | Salzberg et al. | 324—33 |
| 2,455,437 | 12/1948 | Nagel et al. | 324—33 |
| 2,595,611 | 5/1952 | Simpson et al. | 324—33 |
| 2,790,949 | 4/1957 | Ottinger et al. | 324—33 |
| 3,172,037 | 3/1965 | Pfeiffer | 324—30 |
| 3,188,561 | 6/1965 | Ingram | 324—30 |
| 3,267,326 | 8/1966 | Hayward et al. | |

OTHER REFERENCES

Reynolds et al., The Review of Scientific Instruments; vol. 25, October 1954, pp. 1029–1031; A Multi-Circuit Control for Ultra-High Vacuum Gauges.

Nelson et al., The Review of Scientific Instruments; vol. 13, May 1942, pp. 215–217; Emission Regulating Circuit for an Ionization Gauge.

RUDOLPH V. ROLINEC, *Primary Examiner.*

WALTER L. CARLSON, *Examiner.*

C. F. ROBERTS, *Assistant Examiner.*